US007073242B2

(12) United States Patent
Bennett et al.

(10) Patent No.: US 7,073,242 B2

(45) Date of Patent: Jul. 11, 2006

(54) METHODS FOR GRIPPING INSERTS

(75) Inventors: Bruce Bennett, Omaha, NE (US); Dave Butler, Red Oak, IA (US)

(73) Assignee: First Data Corporation, Englewood, CO (US)

( * ) Notice: Subject to any disclaimer, the term of this patent is extended or adjusted under 35 U.S.C. 154(b) by 173 days.

(21) Appl. No.: 10/683,694

(22) Filed: Oct. 9, 2003

(65) Prior Publication Data

US 2005/0077744 A1 Apr. 14, 2005

(51) Int. Cl.
*B23Q 3/00* (2006.01)
*B21D 39/03* (2006.01)

(52) U.S. Cl. .......................................... 29/464; 29/428

(58) Field of Classification Search .................. 29/428, 29/56, 707, 771, 822, 281.5, 283, 464; 294/104; 271/11, 263, 268; 270/56, 52.15

See application file for complete search history.

(56) References Cited

U.S. PATENT DOCUMENTS

| | | | | |
|---|---|---|---|---|
| 1,109,127 | A * | 9/1914 | Juengst | 270/56 |
| 4,462,585 | A * | 7/1984 | Gieson et al. | 271/11 |
| 5,975,514 | A * | 11/1999 | Emigh et al. | 270/58.06 |
| 6,202,005 | B1 | 3/2001 | Mahaffey | |
| 6,349,242 | B1 | 2/2002 | Mahaffey | |

* cited by examiner

*Primary Examiner*—John C. Hong

(74) *Attorney, Agent, or Firm*—Townsend and Townsend and Crew LLP

(57) ABSTRACT

The present application discloses gripping systems and various uses thereof. As one example, a gripping system including a gripping jaw and an extensible bar is disclosed. The gripping jaw includes two opposing members that are operable to grasp a gripped object between the opposing members. The system further includes a bar that includes an upper portion and a lower portion that are coupled via an extensible joint. A distance between the upper portion and the lower portion of the bar at the extensible joint is proportional to a distance between the opposing members when the gripping jaw is in a closed position. Various methods utilizing a gripping system similar to the aforementioned to select mailing inserts are also disclosed.

10 Claims, 8 Drawing Sheets

METHODS FOR GRIPPING INSERTS

CROSS-REFERENCES TO RELATED APPLICATIONS

The present application is related to U.S. patent application Ser. No. 10/036,653, entitled "Mail Handling Equipment & Methods", and filed on Nov. 8, 2001; and U.S. patent application Ser. No. 10/045,589, entitled "System & Methods of Providing Inserts into Envelopes", and filed on Nov. 8, 2001. The aforementioned patent applications are assigned to an entity common hereto, and the entirety of the applications are incorporated herein by reference for all purposes.

BACKGROUND OF THE INVENTION

The present invention is related to systems and methods for mail handling, and in particular to systems and methods for selecting inserts included with mailings.

Preparing insertions for inclusion with mailings can include selecting a number of inserts to be included with the mailings, grasping the selected inserts, and stacking the inserts prior to placing the inserts in an envelope for mailing. In some cases, inserts of different thicknesses are selected. These different thicknesses may not be compatible with existing insertion systems.

Accordingly, among other things, there exists a need in the art for systems and methods to accommodate inserts of differing thicknesses.

BRIEF SUMMARY OF THE INVENTION

Various embodiments of the present invention provide gripping systems and various uses thereof. In particular, some embodiments of the present invention provide gripping systems that include a gripping jaw and an extensible bar. The gripping jaw includes two opposing members that are operable to grasp a gripped object between the opposing members. The system further includes a bar that includes an upper portion and a lower portion that are coupled via an extensible joint. A distance between the upper portion and the lower portion of the bar at the extensible joint is proportional to a distance between the opposing members when the gripping jaw is in a closed position. In some instances, the gripping system further includes another bar that is coupled to the previously described extensible bar, and is oriented approximately parallel to the extensible bar.

In some cases, a post extends from the other bar, and an elastic force element is placed between the post and one of the opposing members. In particular instances, the elastic force element is a spring, while in other instances the elastic force element is a rubber band. This elastic force element provides a force operable to encourage the first opposing member to move toward the second opposing member at the contact point. In various cases, the gripping system further comprises a rod that extends thorough the other bar, and a knuckle coupled to the rod. One end of the extensible bar is attached to the knuckle at a point away from the rod.

In other cases, the gripping system comprises a motor coupled to the rod. The motor is operable to rotate the rod such that the knuckle moves at least the extensible bar and at least one of the opposing members. Further, another or the same motor can be used to rotate a cam shaft that is coupled to the other bar.

In various cases, the gripping system includes a plurality of gripping mechanisms. Each of such gripping mechanisms include a gripping jaw, an extensible bar, and another bar. The various gripping mechanisms can be coupled to the same rod and cam shaft. In such cases, each of the gripping mechanisms can be configured to grasp inserts of differing thicknesses. In such cases, the distance from the upper portion to the lower portion of the extensible bar at the extensible joint for one of the gripping systems can be different from that of another gripping mechanism where the thickness of the insert grasped by the respective gripping mechanism is different. Indeed, the distance can vary based at least in part on the thickness of the insert grasped by the particular gripping mechanism.

Other embodiments of the present invention provide methods for selecting inserts for insertion. The methods include providing two or more holding locations that each are adapted to hold a stack of inserts. Further, two or more gripping mechanisms are provided. Each of the provided gripping mechanisms include a gripping jaw coupled to an extensible bar. The extensible bar includes an upper portion and a lower portion coupled via an extensible joint. When the gripping jaw is in a closed position, the distance between the upper portion and the lower portion at the extensible joint is proportional to an insert grasped between opposing members of the gripping jaw. Thus, the distance between the upper portion and the lower portion of the extensible bar for one gripping mechanism may be different from that of another gripping mechanism where the thickness of inserts grasped in the respective gripping jaws varies.

Such methods can further include advancing two or more of the gripping mechanisms such that one of the gripping mechanisms moves toward one of the holding locations with the gripping jaw in an open position, and another of the gripping mechanisms moves toward another of the holding locations with the gripping jaw in an open position. The respective gripping jaws are closed such that an insert originating from one of the holding locations is grasped by one of the gripping jaws, and an inert originating from another of the holding locations is grasped by another of the gripping jaws. In some cases, the gripping mechanisms are coupled to respective knuckles that are each coupled to a common rod. In such cases, advancing the gripping mechanisms can include rotating the rod in a rotational direction such that the first knuckle and the second knuckle move. In various cases, each of the gripping mechanisms include a non-extensible bar that is coupled to a cam shaft. In such cases, closing the respective gripping jaws includes rotating the rod in an opposite rotational direction such that the first knuckle moves causing the respective extensible bars to move relative to the respective non-extensible bars. Through this movement, the opposing members of the respective gripping jaws move toward one another at respective contact points. As the respective gripping jaws close, the extensible joints associated with each of the gripping jaws adjust to match the thickness of one or more inserts grasped between the respective gripping jaws.

Other embodiments of the present invention provide other methods for selecting inserts for insertion. Such methods include providing a holding location that is adapted to hold a stack of inserts, and providing a gripping mechanism that includes a gripping jaw with opposing members. The gripping mechanism also includes a bar coupled to at least one of the opposing members. The bar includes an upper portion and a lower portion that are coupled via an extensible joint. The methods further include advancing the gripping mechanism such that the gripping jaw moves toward the holding location with the gripping jaw in an open position, and closing the gripping jaw such that at least one of the inserts is grasped between the opposing members of the gripping jaw. In such an orientation, a distance from the upper portion to the lower portion of the bar at the extensible joint is proportional to the thickness of the insert(s) grasped within the gripping jaw.

In particular instances, the gripping mechanism is coupled to a knuckle mounted on a rod, and advancing the gripping mechanism includes rotating the rod such that the knuckle moves causing the gripping mechanism to advance toward the holding location. Further, in some cases, the gripping mechanism is coupled to a cam shaft, and advancing the gripping mechanism also includes moving the cam shaft causing the gripping mechanism to move toward the holding location.

This summary provides only a general outline of some embodiments according to the present invention. Many other objects, features, advantages and other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present invention is related to systems and methods for mail handling and/or other situations where objects are to be grasped. In particular, various embodiments of the present invention provide gripping systems and methods for use thereof. As one example, a gripping system including a gripping jaw and an extensible bar is disclosed. The gripping jaw includes two opposing members that are operable to grasp a gripped object there between. The system further includes a bar that includes an upper portion and a lower portion that are coupled via an extensible joint. A distance between the upper portion and the lower portion of the bar at the extensible joint is proportional to a distance between the opposing members when the gripping jaw is in a closed position. Various methods utilizing a gripping system similar to the aforementioned to select mailing inserts are also disclosed. However, it will be recognized by one of ordinary skill in the art that the systems disclosed herein can be used in relation to a variety of other methods, equipment, and/or processes.

In one exemplary case, the systems and methods of the present invention can be utilized in relation to mail preparation equipment. Such preparation equipment can in some cases print mailings, attach one or more credit cards to the mailings, fold the mailings, match one or more inserts to the mailings, retrieve the matched inserts and place the inserts into an envelope with the mailings. One example of such a machine is described in, for example, U.S. patent application Ser. No. 10/045,589, entitled "System & Methods of Providing Inserts into Envelopes", and filed on Nov. 8, 2001. Again, the entire disclosure of the aforementioned is incorporated herein by reference for all purposes.

Further, as another example, the systems and methods of the present invention can be used in relation to a machine disclosed in U.S. patent application Ser. No. 10/036,653, entitled "Mail Handling Equipment & Methods", and filed on Nov. 8, 2001. Again, the aforementioned was previously incorporated herein by reference for all purposes. Further, the discussion of FIGS. 1–3 below is adapted from the aforementioned.

Figure 1:
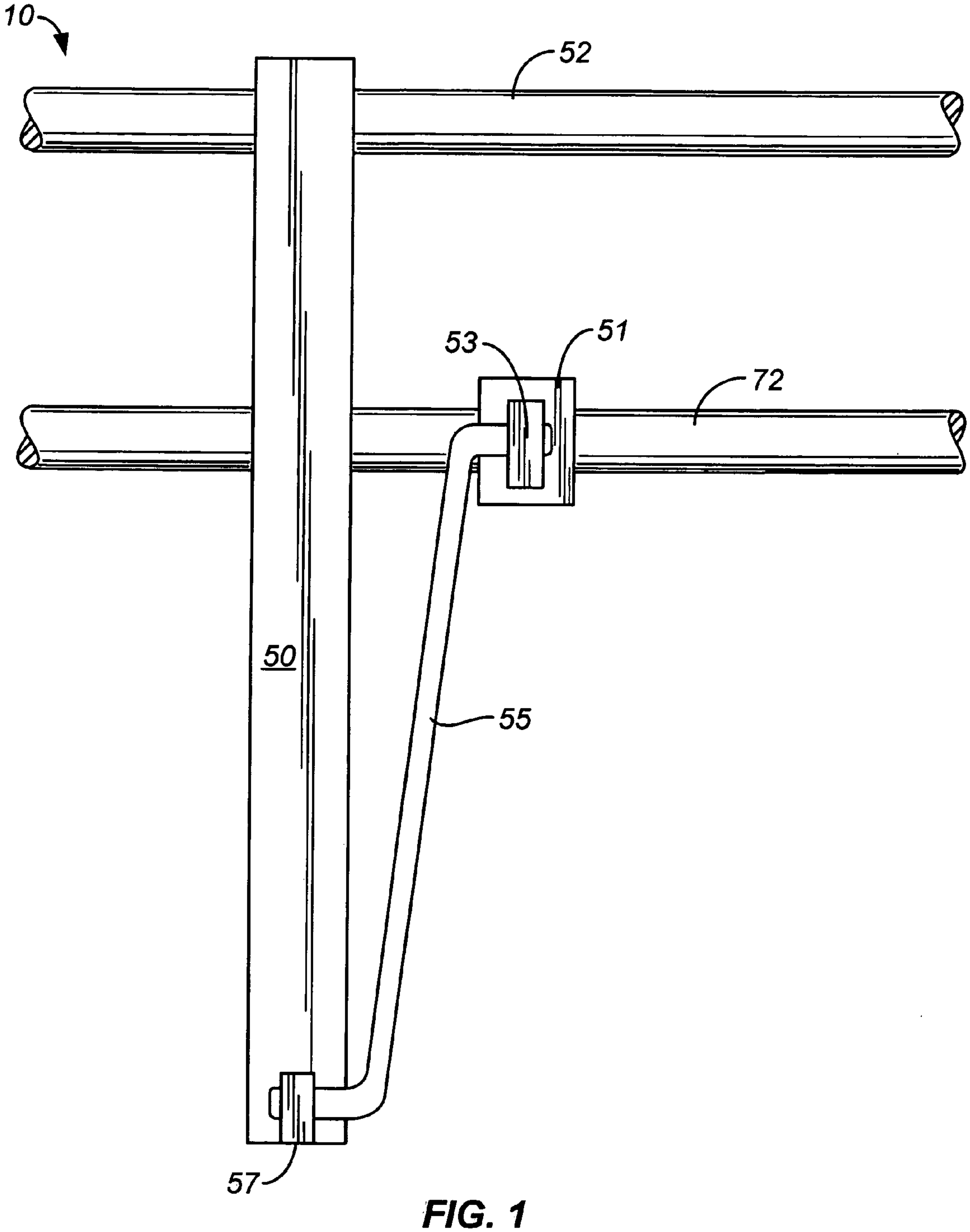
FIG. 1 illustrates a gripping mechanism including two non-extensible bars that move relative to one another to cause the operation of a gripping jaw.
Figure 2:
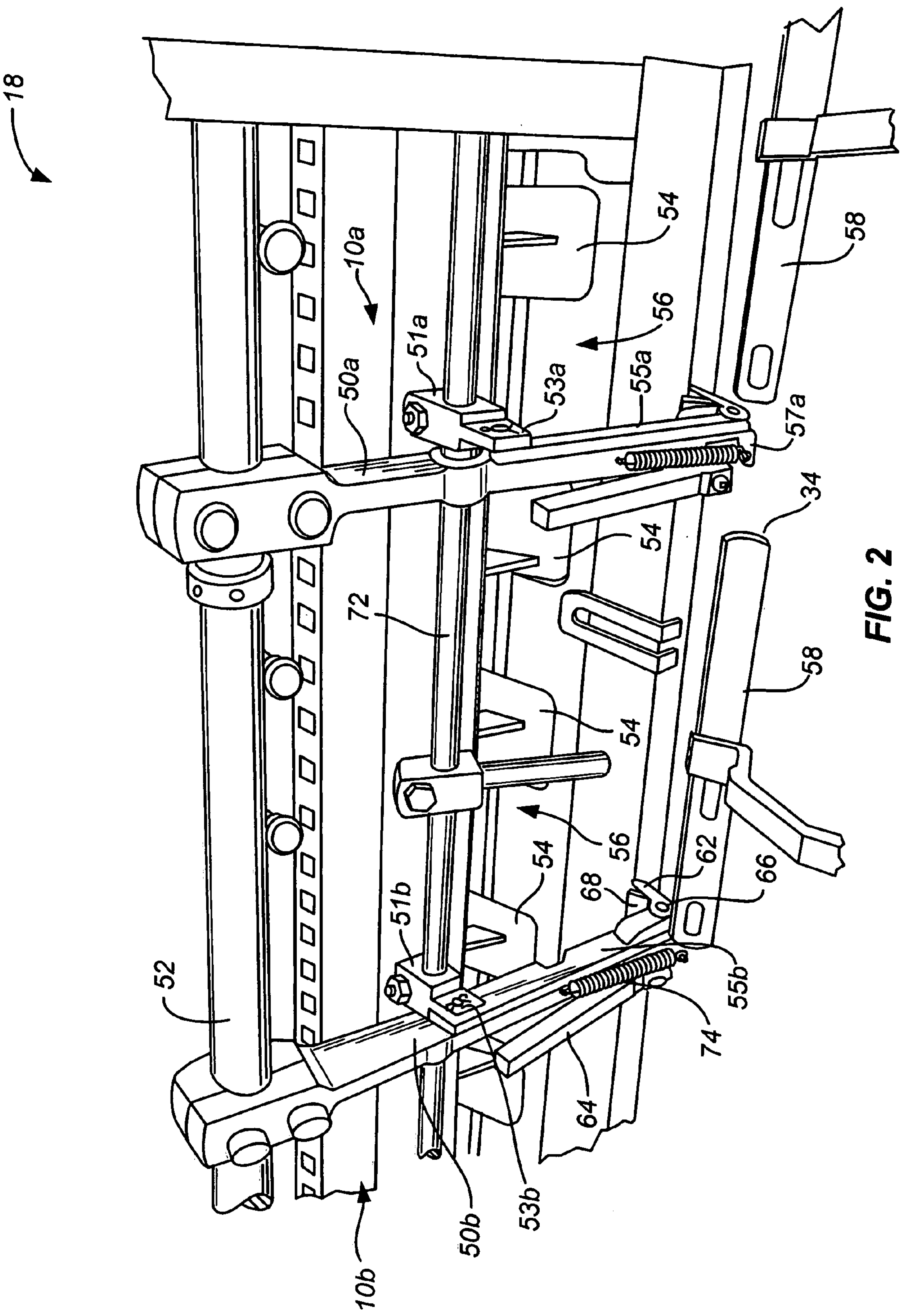
FIG. 2 illustrates multiple of the gripping mechanisms of FIG. 1 utilized in an insertion system.
Figure 3:
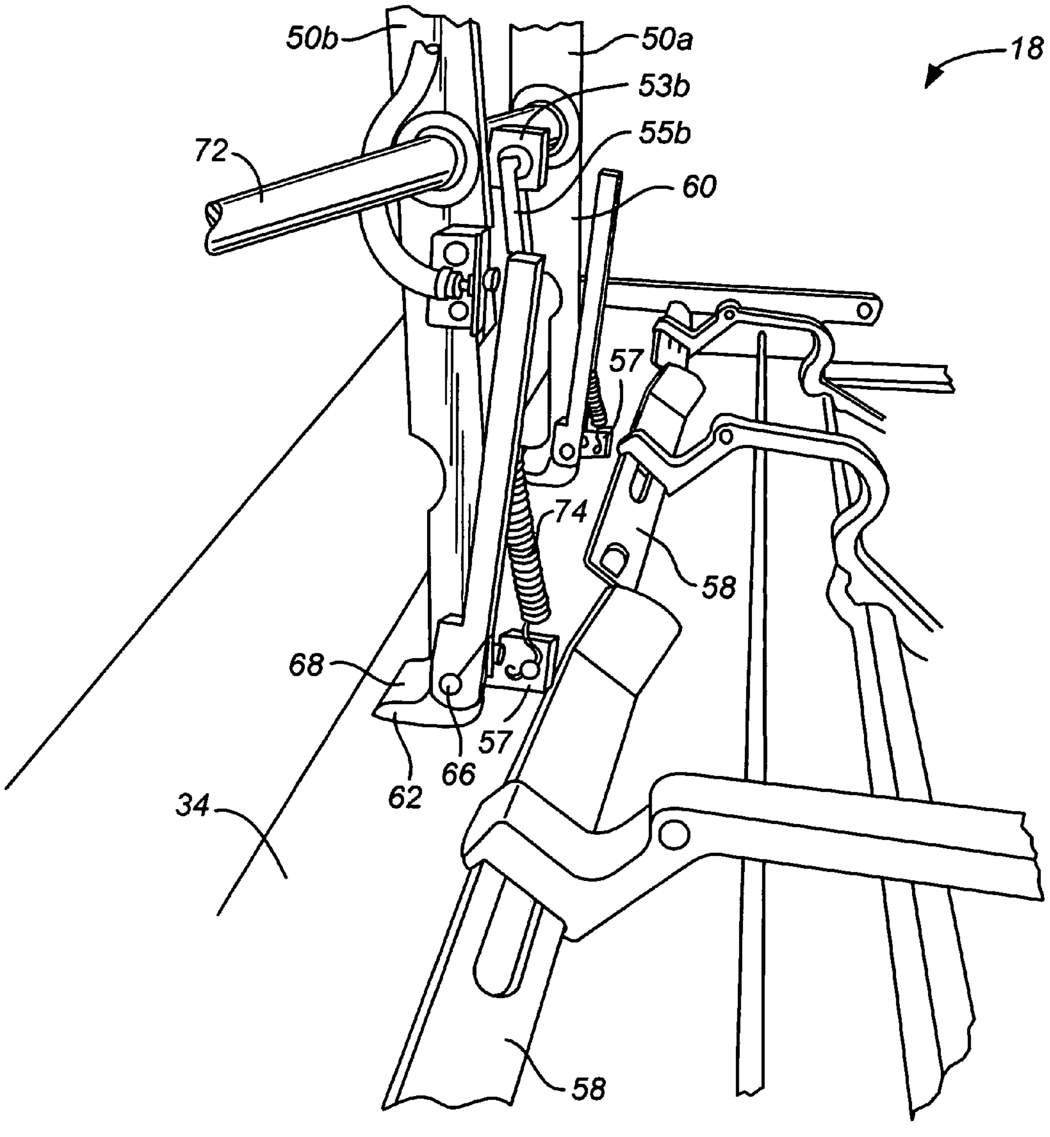
FIG. 3 illustrates another view of the insertion system provided in FIG. 2.

Referring to FIG. 1, a gripping mechanism 10 is illustrated that can be used in relation to an insertion system 18 more fully described in relation to FIGS. 2–3. Gripping mechanism 10 includes a first solid bar 50 coupled to a cam shaft 52 that in some cases can be formed to create a variable rotation, or that can be formed as a straight bar. In some cases, cam shaft 52 passes through solid bar 50. In addition, a rod 72 passes through solid bar 50.

A knuckle 51 is coupled to rod 72, and another solid bar 55 is coupled to knuckle 51 at a coupling point 53 located apart from rod 72. Both solid bar 50 and solid bar 55 are coupled to a gripping jaw 57 that includes opposing members 62, 68 that can pinch together to grasp an object.

Turning to FIGS. 2–3, gripping mechanism 10 is illustrated as part of an insertion system 18. Insertion system 18 includes a conveyor 34 that facilitates various inserts to be selectively placed onto the matched sheets passing along conveyor 34. Prior to placement on conveyor 34, the inserts are stacked within insert holding locations (not shown). An example of such insert holding locations is more fully described in the aforementioned U.S. patent application Ser. No. 10/036,653 as insert feeders. An insert from the insert holding locations is advanced toward conveyor 34 so that it may be grasped by gripping mechanisms 10 when an appropriate signal is given by a computer (not shown). Each gripping mechanism 10 is coupled to cam shaft 52 that rotates clockwise and counter clockwise in an alternating manner to move gripping mechanisms 10 toward and away from the advanced insert. Conveniently, the advanced insert may rest on a track 54 having a slot 56 to permit gripping mechanism 10 to grasp the insert if needed. If an insert is grasped, it may be released on the back swing to drop the insert onto the matched sheets on conveyor 34. Conveniently, top rails 58 may be moved on top of the matched pages and any inserts to hold the stacks in place as they are moved along conveyor 34.

As previously discussed in relation to FIG. 1, each gripping mechanism 10 comprises solid bar 50 that is coupled to cam shaft 52 and a first opposing member 62 extending from solid bar 50. Another solid bar 55 is coupled to solid bar 50 at a pivot point 66, and a second opposing member 68 is coupled to solid bar 55. Solid bar 55 is also coupled to rod 72 that is rotated to move solid bar 55 back and forth. In this way, the two jaws may be moved relative to each other simply by rotating rod 72. An elastic force element 74 may be used to bias opposing members 62, 68 together.

In operation, bar 50 is continuously rotated in an alternating direction to move gripping jaw 57 including opposing members 62, 68 toward and away from slots 56, with opposing members 62, 68 being separated from each other. If an insert is selected to be grasped, the insert is added to the sheets on conveyor 34, rod 72 is rotated to cause opposing members 62, 68 to close once they have passed over the selected insert. As gripping mechanism 10 swings back, the grasped insert passes over conveyor 34 and rod 72 is rotated in an opposite direction to release the insert which falls onto the matched sheets on conveyor 34.

In some cases, it has been found that, for example, where an insert grasped by gripping mechanism 10*a* is thicker than an insert grasped by gripping mechanism 10*b* that one gripping mechanism 10 may fail to grasp the thinner insert. Various embodiments of the present invention address this identified problem. Based on the disclosure provided herein, however, one of ordinary skill in the art will appreciate a number of other advantages of systems and methods in accordance with embodiments of the present invention.

Figure 4:
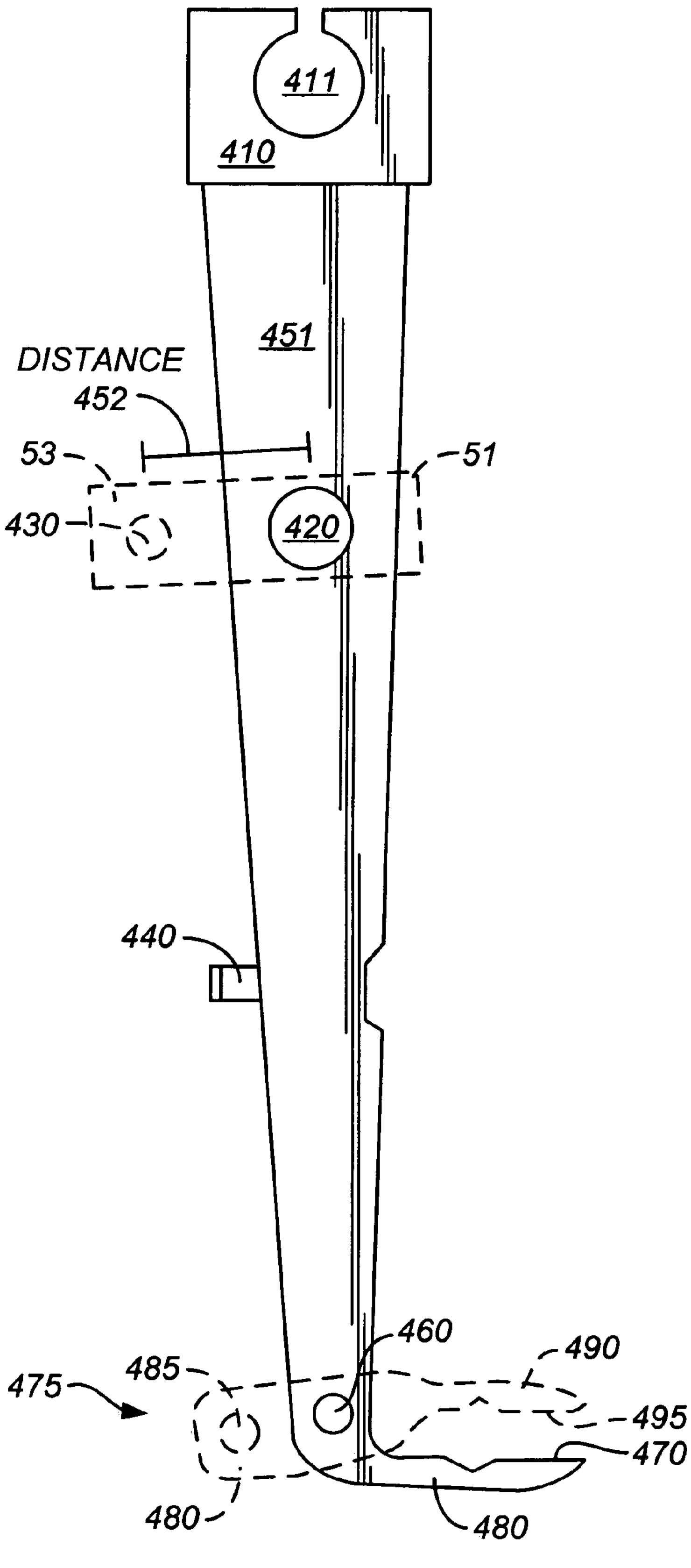
FIG. 4 illustrates a portion of a gripping mechanism used in relation to some embodiments of the present invention.

Turning to FIG. 4, a non-extensible bar 451 forming part of a gripping mechanism is illustrated. Bar 451 is illustrated in reference to knuckle 51 and an upper opposing member 480 of a gripping jaw 475. Each of knuckle 51 and upper opposing member 480 are depicted in dashed lines. As illustrated, bar 451 includes an upper joint 410 that includes an opening 411. Opening 411 is tailored to couple to the previously described cam shaft 52. Further, bar 451 includes a coupling point 420 that is tailored to couple to the previously described rod 72. Also, bar 451 includes a post 440, and a coupling point 460 where an axis of gripping jaw 475 fits.

As illustrated, bar 451 is “attached” to a lower opposing member 450 of gripping jaw 475. As used herein, the term attached can mean either fastened to, coupled to, and/or formed as part of. Thus, consistent with this definition, lower opposing member 450 is attached to bar 451 where it is formed as part of bar 451. Alternatively, lower opposing member 450 can be welded to bar 451, or in some other way fastened to bar 451.

Knuckle 51 includes coupling point 53 and a coupling hole 430 within coupling point 53. Coupling hole 430 is located a distance 452 from coupling point 420. Further, gripping jaw 475 includes an upper opposing member 490, a coupling point 480 with a coupling hole 485 therein, and lower opposing member 450. Upper opposing member 490 pivots about coupling point 460 such that gripping jaw 475 can be opened and closed at a contact point where a surface 495 of upper opposing member 490 and a surface 470 of lower opposing member 450 contact each other, or an insert grasped between the opposing members 450, 490.

Figure 5:
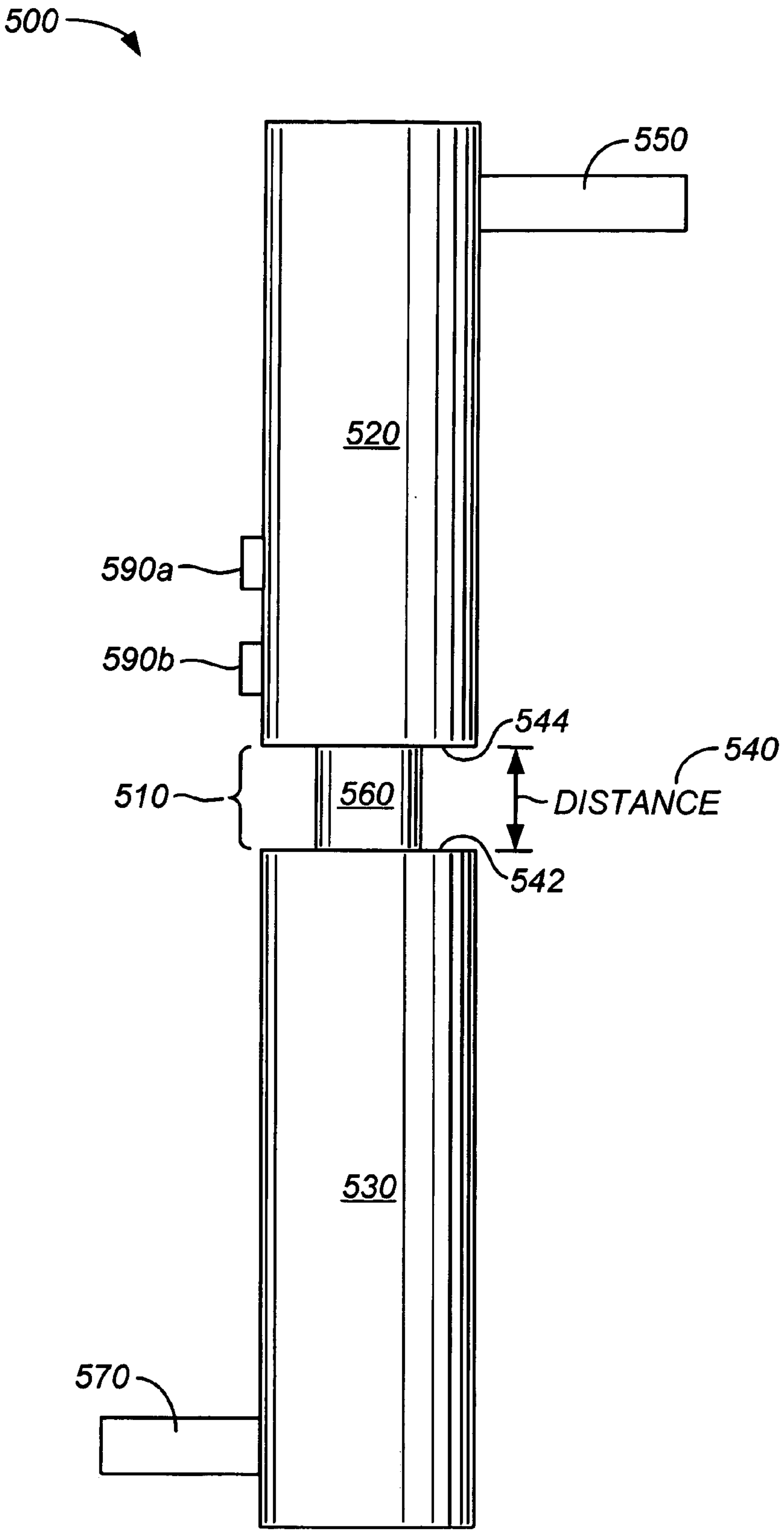
FIG. 5 illustrates an extensible bar portion of a gripping mechanism in accordance with various embodiments of the present invention.

Turning to FIG. 5, an extensible bar 500 in accordance with some embodiments of the present invention is illustrated. As illustrated, extensible bar 500 includes an upper portion 520 and a lower portion 530 coupled via an extensible joint 510. Extensible joint 510 includes a coupling element 560 between upper portion 520 and lower portion 530. In one case, coupling element 560 is a rod inserted into both upper portion 520 and lower portion 530. In this case, the rod is attached to upper portion 520 via bolts 590. In operation, lower portion 530 can move along this rod such that a distance 540 between a surface 544 and a surface 542 varies. Based on this disclosure, one of ordinary skill in the art will appreciate other extensible joints that can be used in accordance with the present invention. Also, in one particular instance, distance 540 can vary from approximately zero to one inch, however, other variations in distance are also possible in accordance with the present invention. Extensible bar 500 also includes a coupling post 550 and a coupling post 570.

Figure 6A:
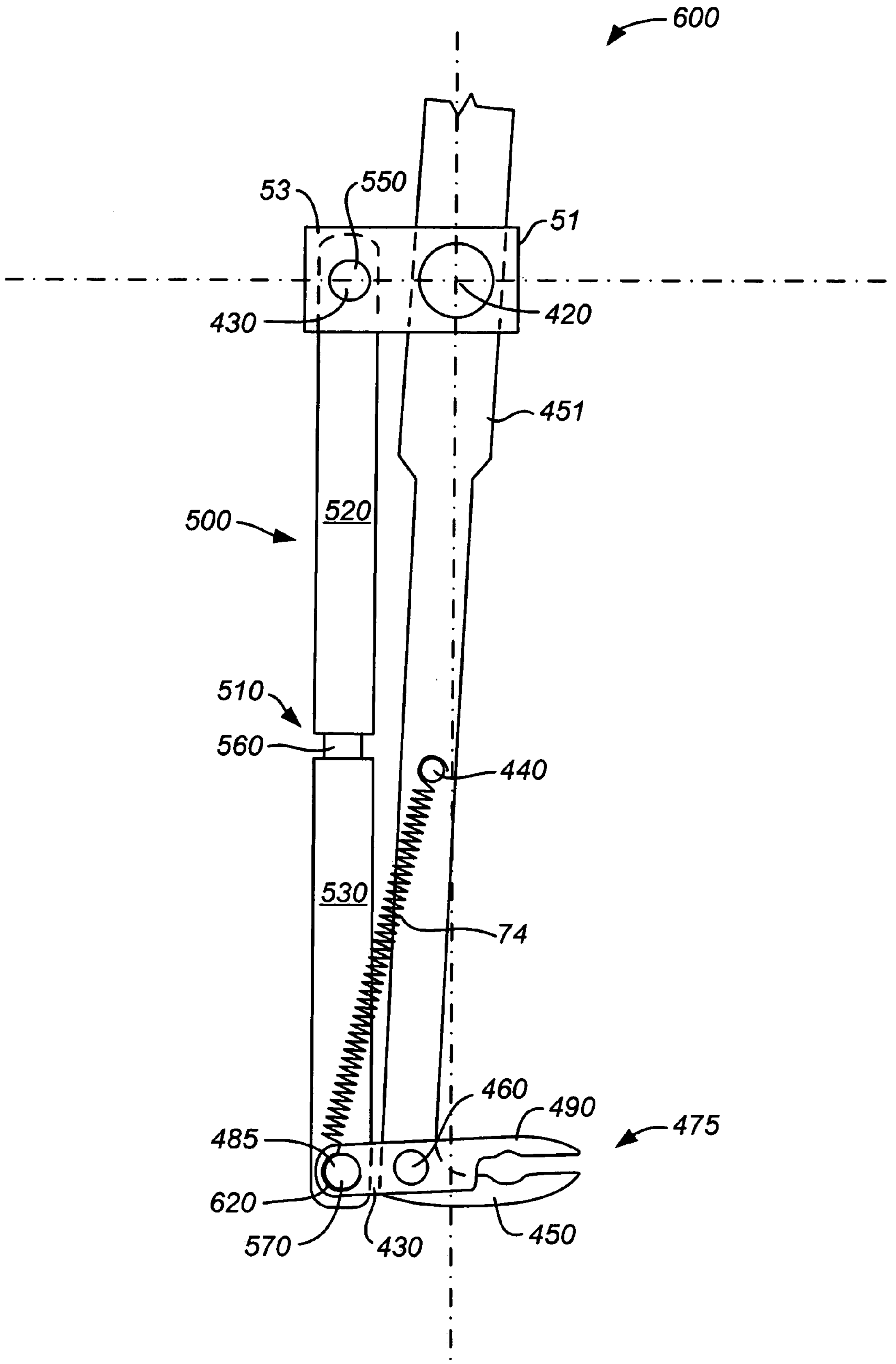
FIG. 6 illustrate a gripping mechanism and the operation thereof in accordance with embodiments of the present invention.

Referring to FIG. 6*a*, an assembled gripping mechanism 600 including extensible bar 500 and non-extensible bar 451 is illustrated. As assembled, coupling post 550 passes through coupling hole 430 of knuckle 51, and coupling post 570 passes through coupling hole 485 of gripping jaw 475. Thus, non-extensible bar 451 is oriented approximately parallel to extensible bar 500. As used herein, the term approximately parallel means that the angle between the two bars is less than forty-five degrees. In one particular embodiment, the angle is less than ten degrees. Rod 72 passes through bar 451 at coupling point 420, and through knuckle 51 at another coupling point (not shown). Cam shaft 52 passes through opening 411 of bar 451, and elastic force element 74 is installed between post 440 and a contact point 620 associated with gripping jaw 475.

Figure 6B:
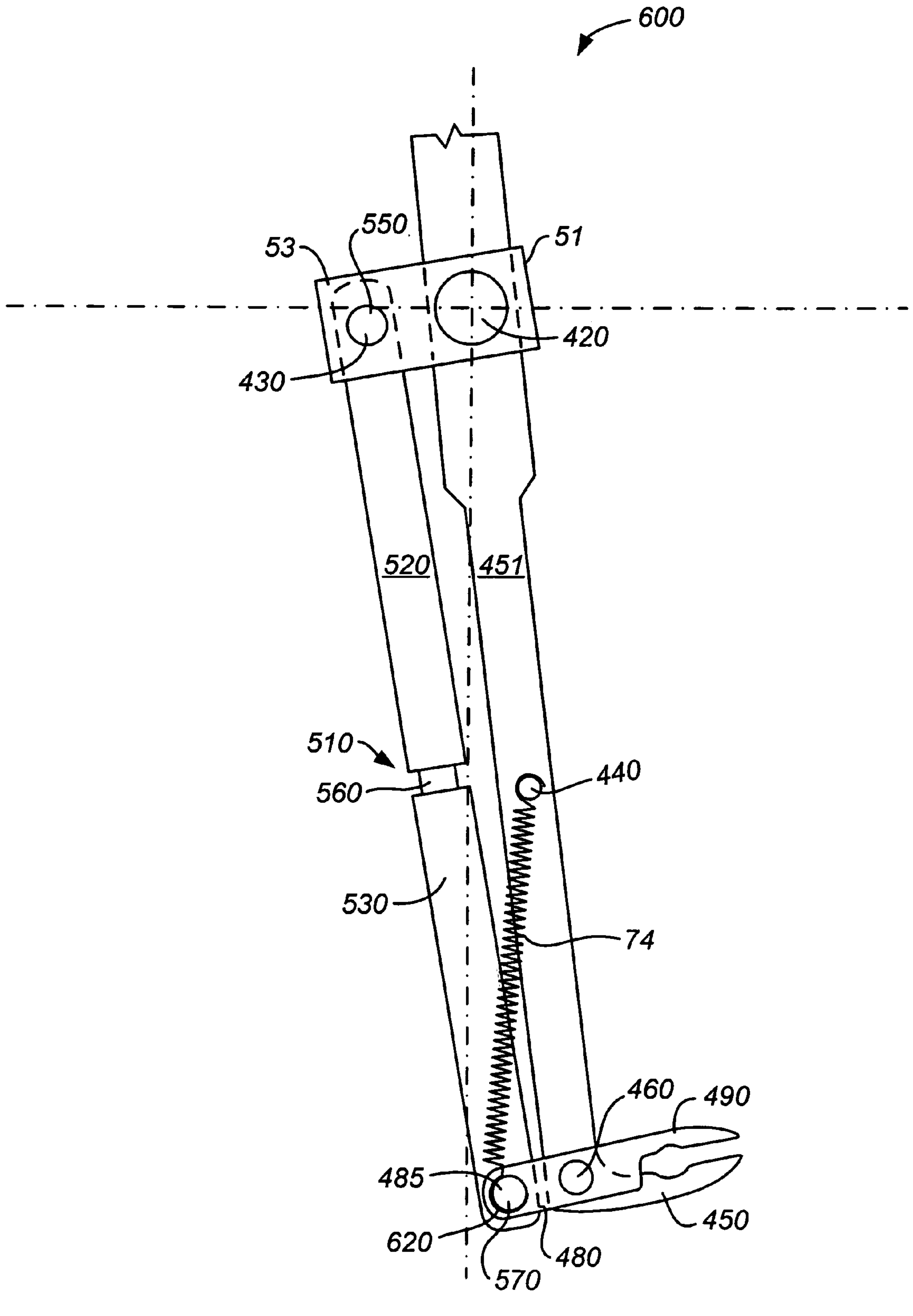

FIG. 6*a* illustrates gripping mechanism 600 in the return position where it is ready to begin the process of grasping an insert, and dropping the grasped insert on conveyer 34. The next step in the process of grasping an insert is illustrated in FIG. 6*b*, where rod 72 and cam shaft 52 (FIG. 1) rotate such that gripping jaw 475 moves toward a holding location (not shown). More specifically, in this step, rod 72 is rotated counter clockwise. As illustrated, knuckle 51 moves with the rotation of rod 72 such that coupling point 53 located apart from rod 72 moves downward. During this movement, both non-extensible bar 451 and extensible bar 500 move approximately together such that opposing members 490, 450 remain apart with gripping jaw 475 in the open position. The movement of gripping mechanism 600 illustrated in FIG. 6*b* continues until opposing members 490, 450 are positioned on either side of a selected insert to be grasped.

Figure 6C:
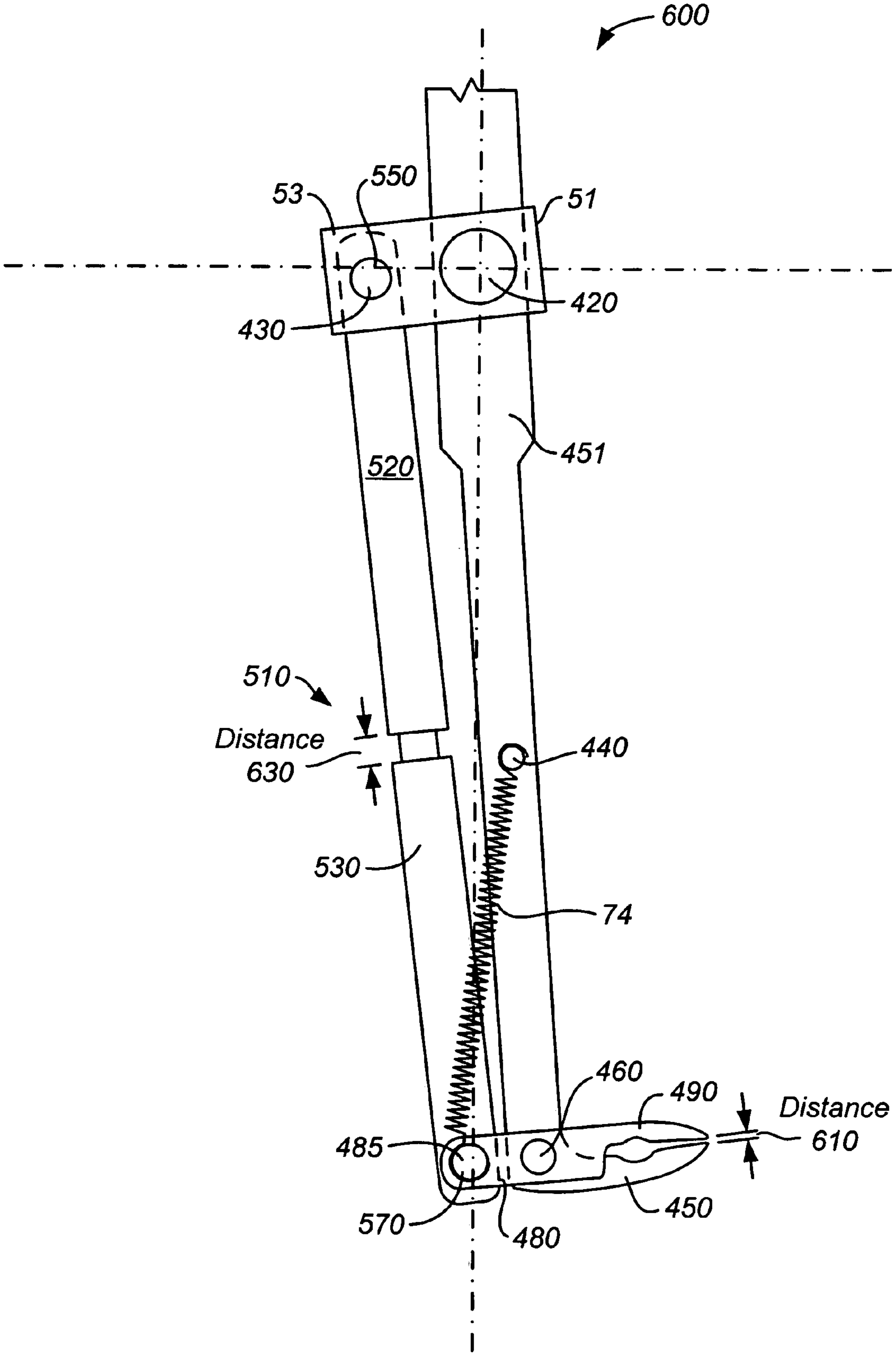

With gripping jaw 475 positioned next to a selected insert, rod 72 is rotated clockwise while non-extensible bar 451 is maintained in a relatively static position. This movement is depicted in FIG. 6*c*, and causes extensible bar 500 to pull upward on coupling post 570 at coupling hole 485. By pulling upward, opposing members 490, 450 are brought toward each other and into contact with a grasped insert. In this process, extensible joint 510 adjusts depending upon the thickness of the grasped insert.

More specifically, using the exemplary embodiment in FIGS. 6 as an example, a distance 610 (i.e., distance between opposing members 490, 450) will be approximately the thickness of a grasped insert. This distance 610 is proportionally reflected in a distance 630 (distance between upper portion 520 and lower portion 530). As used herein, the terms “proportional” or “proportionally reflected” are used in the broadest sense. These terms mean that any change in distance 610 is reflected in distance 630. This can include, for example, doubling distance 630 where distance 610 doubles, dividing distance by three 630 where distance 610 doubles, subtracting an amount from distance 630 where distance 610 increases, adding an amount to distance 630 where distance 610 increases, or the like. A similar approach can be applied where distance 610 decreases. As just some more specific examples where a first grasped insert results in a distance 610 of five millimeters and a second grasped insert results in a distance 610 of ten millimeters, the following lists some "proportional" distances 630 for the respective first and second grasped inserts: a distance 630 of five millimeters for the first and ten millimeters for the second; a distance 630 of ten millimeters for the first and twenty millimeters for the second; a distance 630 of five millimeters for the first and two and one half millimeters for the second; a distance 630 of twenty millimeters for the first and twenty-two millimeters for the second; a distance 630 of eight millimeters for the first and six millimeters for the second. Based on the foregoing examples, one of ordinary skill in the art will appreciate a number of other of other "proportional" relationships between distance 610 and distance 630 that can be implemented in accordance with embodiments of the present invention.

In the illustrated case, where distance 610 increases, distance 630 also increases. Similarly, where distance 610 decreases so does distance 630. In this particular example, the proportional relationship or match between distance 610 and distance 630 is applicable when gripping jaw 475 is in the closed position. Based on the disclosure provided herein, it should be recognized by one of ordinary skill in the art that different configurations of gripping mechanism 600 can be implemented in accordance with the present invention that would provide various expansions and/or contractions of extensible joint 510 based on distance 610 when an insert is grasped.

At this point, rod 72 and cam shaft 52 are moved such that gripping mechanism 600 returns to the position illustrated in FIG. 6*a*. As gripping mechanism 600 returns, extensible bar 500 moves relative to non-extensible bar 451 causing a downward movement of coupling post 570 at coupling hole 485. This causes gripping jaw 475 to open, and any grasped insert(s) to drop onto conveyer 34.

The invention has now been described in detail for purposes of clarity and understanding. However, it will be appreciated that certain changes and modifications may be practiced within the scope of the appended claims. Thus, although the invention is described with reference to specific embodiments and figures thereof, the embodiments and figures are merely illustrative, and not limiting of the invention. Rather, the scope of the invention is to be determined solely by the appended claims.

What is claimed is:

1. A method for selecting inserts for insertion, the method comprising:

providing a first holding location that is adapted to hold a stack of first inserts;

providing a second holding location that is adapted to hold a stack of second inserts;

providing a first gripping mechanism, wherein the first gripping mechanism includes:

a first gripping jaw, wherein the first gripping jaw includes a first opposing member and a second opposing member, and wherein the first opposing member and the second opposing member are operable to grasp at least one of the first inserts between the first opposing member and the second opposing member at a first contact location; and a first bar coupled to at least the first opposing member, wherein the first bar comprises an upper portion and a lower portion, wherein the upper portion is coupled to the lower portion via an extensible joint, and wherein a distance from the upper portion to the lower portion at the extensible joint is proportional to the thickness of the at least one of the first inserts;

providing a second gripping mechanism, wherein the second gripping mechanism includes:

a second gripping jaw, wherein the second gripping jaw includes a third opposing member and a fourth opposing member, and wherein the third first opposing member and the fourth opposing member are operable to grasp at least one of the second inserts between the third opposing member and the fourth opposing member at a second contact location;

a second bar coupled to at least the third opposing member, wherein the bar comprises an upper portion and a lower portion, wherein the upper portion is coupled to the lower portion via an extensible joint, and wherein a distance from the upper portion to the lower portion at the extensible joint is proportional to the thickness of the at least one of the second inserts; and wherein the first gripping mechanism and the second gripping mechanism are associated with a common rod.

2. The method of claim 1, wherein the method further comprises:

advancing both the first gripping mechanism and the second gripping mechanism such that the first gripping jaw moves toward the first holding location with the first gripping jaw in an open position, and the second gripping jaw moves toward the second holding location with the second gripping jaw in an open position;

closing the first gripping jaw, wherein at least one of the first inserts is grasped between the first opposing member and the second opposing member, and wherein a distance from the upper portion to the lower portion of the first bar at the extensible joint is proportional to the thickness of the at least one of the first inserts; and closing the second gripping jaw, wherein at least one of the second inserts is grasped between the third opposing member and the fourth opposing member, and wherein a distance from the upper portion to the lower portion of the second bar at the extensible joint is proportional to the thickness of the at least one of the second inserts.

3. The method of claim 2, wherein the first gripping mechanism is coupled to a first knuckle and the second gripping mechanism is coupled to a second knuckle, wherein the first knuckle and the second knuckle are coupled to a common rod, and wherein advancing both the first gripping mechanism and the second gripping mechanism includes rotating the rod in a rotational direction such that the first knuckle and the second knuckle move.

4. The method of claim 2, wherein the first bar is a first extensible bar and wherein the second bar is a second extensible bar, wherein the first gripping mechanism includes a first non-extensible bar and the second gripping mechanism includes a second non-extensible bar, wherein the rod passes through the first non-extensible bar and the second non-extensible bar, and wherein closing the first gripping jaw and the second gripping jaw includes rotating the rod in an opposite rotational direction such that the first knuckle moves causing the first extensible bar to move relative to the first non-extensible bar and causing the first opposing member to move toward the second opposing member at a first contact point and the second knuckle moves causing the second extensible bar to move relative to the second non-extensible bar and causing the third opposing member to move toward the fourth opposing member at a second contact point.

5. The method of claim 4, wherein closing the first gripping jaw and the second gripping jaw includes adjusting the first extensible joint to match a thickness of the at least one of the first inserts and adjusting the second extensible joint to match a thickness of the at least one of the second inserts.

6. A method for selecting inserts for insertion, the method comprising:

providing a holding location that is adapted to hold a stack of inserts;

providing a gripping mechanism, wherein the gripping mechanism includes:

a gripping jaw, wherein the gripping jaw includes a first opposing member and a second opposing member; and a bar coupled to at least the first opposing member, wherein the bar comprises an upper portion and a lower portion, and wherein the upper portion is coupled to the lower portion via an extensible joint, advancing the gripping mechanism such that the gripping jaw moves toward the holding location with the gripping jaw in an open position; and closing the gripping jaw, wherein at least one of the inserts is grasped between the first opposing member and the second opposing member, and wherein the extensible joint adjusts itself to vary a distance between the upper portion and the lower portion of the bar as the gripping jaw closes, and wherein the distance from the upper portion to the lower portion of the bar at the extensible joint is proportional to the thickness of the at least one of the inserts.

7. The method of claim 6, wherein the gripping mechanism is coupled to a knuckle mounted on a rod, and wherein advancing the gripping mechanism includes rotating the rod such that the knuckle moves causing the gripping mechanism to advance toward the holding location.

8. The method of claim 7, wherein the gripping mechanism is further coupled to a cam shaft, and wherein advancing the gripping mechanism further includes moving the cam shaft causing the gripping mechanism to move toward the holding location.

9. The method of claim 6, wherein the bar is an extensible bar, wherein the gripping mechanism further comprises a non-extensible bar, wherein the second opposing member is attached to the non-extensible bar, wherein the extensible bar is coupled to a knuckle mounted on a rod, and wherein advancing the gripping mechanism includes rotating the rod in a rotational direction such that the knuckle moves causing the gripping mechanism to advance toward the holding location; and wherein closing the gripping jaw includes rotating the rod in an opposite rotational direction such that the knuckle moves causing the extensible bar to move relative to the non-extensible bar and causing the first opposing member to move toward the second opposing member at a contact point.

10. The method of claim 9, wherein the non-extensible bar is coupled to a cam shaft, and wherein advancing the gripping mechanism further includes moving the cam shaft.

* * * * *